Figure 1:
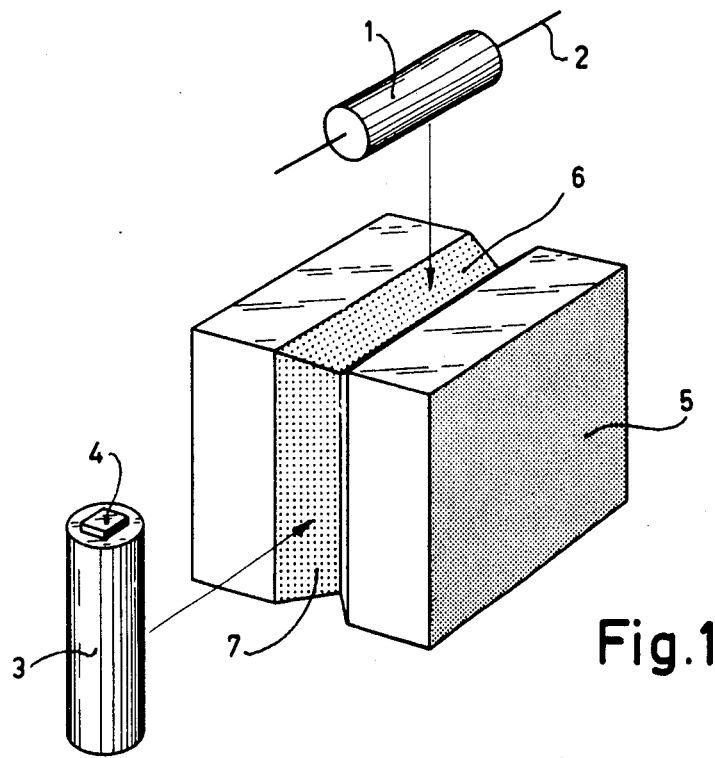

United States Patent [19]

Khoe et al.

[11] 4,030,811
[45] June 21, 1977

[54] DEVICE FOR COUPLING A LIGHT SOURCE TO AN OPTICAL FIBER

[75] Inventors: Giok Djan Khoe; Gerard Kuyt; Adrianus Jacobus Jozef Franken, all of Eindhoven, Netherlands

[73] Assignee: U.S. Philips Corporation, New York, N.Y.

[22] Filed: Apr. 9, 1976

[21] Appl. No.: 675,495

[30] Foreign Application Priority Data

May 14, 1975 Netherlands ............ 7505629

[52] U.S. Cl. .................. 350/96 C; 350/96 R; 350/96 WG
[51] Int. Cl.² .................................. G02B 5/14
[58] Field of Search ......... 350/96 C, 96 WG, 96 R; 29/200 P, 200 J, 203 P

[56] References Cited
UNITED STATES PATENTS 3,628,036  12/1971  Humphrey ............... 350/96 C
3,800,388  4/1974   Börner et al. ........... 350/96 C

OTHER PUBLICATIONS

Dalgleish et al., "Optical-Fibre Connector" Electronics Letters, vol. 11, No. 1, pp. 24-26, Jan. 1975.

*Primary Examiner*—John K. Corbin
*Assistant Examiner*—Stewart Levy
*Attorney, Agent, or Firm*—Frank R. Trifari; Carl P. Steinhauser

[57] ABSTRACT

A device for coupling a light source, in particular a semiconductor laser, to an optical fiber in which the light source and the optical fiber are each connected to a cylindrical or part-cylindrical support and a coupling member is provided having two V-shaped grooves enclosing mutually a substantially right angle, in which the cylindrical supports, possibly carried by an additional member, after their mutual adjustment in the V-shaped grooves, are secured to the contact member. One of the supports may advantageously be provided in a V-shaped groove of a cylindrical or part-cylindrical auxiliary member which is secured in one of the V-shaped grooves of the coupling member.

6 Claims, 3 Drawing Figures

DEVICE FOR COUPLING A LIGHT SOURCE TO AN OPTICAL FIBER

The invention relates to a device for coupling a light source, in particular a semiconductor laser, to an optical fiber, in which the light source and the optical fiber are each connected to a support and the supports are connected together.

The coupling of optical fibers to, for example, semiconductor lasers is important inter alia in relation to transmission over optical cables in communication systems. In order to obtain a high coupling efficiency it is of the utmost importance that the adjustment of the laser relative to the optical fibre be carried out extremely accurately.

It is known (Bell System Technical Journal, March 1972, pp. 573-594) to mount a laser and an optical fiber each on a holder, to place each of the holders on a separate micromanipulator, and then to move the laser and the optical fiber into a mutually desired position. The open space between the two holders is then filled with adhesive, a mutual coupling of the laser and the fiber being obtained. However, this way of coupling exhibits drawbacks. Since the two holders have no direct mechanical contact during the positioning, the stability during the adjustment is low. Furthermore, since the adhesive shrinks upon hardening, a shifting of the holders may occur. For example, optimum operation will not occur when coupling a single-mode optical fiber and a laser since in such a case the accuracy of positioning should be in the order of magnitude of 0.1 micron.

It is an object of the invention to provide a device for coupling a light source, for example a semiconductor laser, and an optical fibre in which a very high accuracy of adjustment can be achieved and in which drawbacks of known coupling methods are avoided. To this end, according to the invention the supports are cylindrical or part-cylindrical, a coupling member is provided which has two V-shaped grooves mutually enclosing a substantially right angle, and the cylindricl supports, possibly carried by an additional member, after having been adjusted mutually in the V-shaped grooves, are secured to the coupling member.

Via the coupling member, the supports have a direct mutual mechanical contact so that a very stable adjustment is possible. The connection may be carried out, for example, by means of an adhesive; since the cylindrical supports remain in contact with the walls of the V-shaped grooves, no mutual shifting will occur also when the adhesive shrinks. The adjustment of the optical fiber relative to the laser may be carried out by sliding the supports in the V-shaped grooves, as well as by rotation of the supports.

In order to permit a low machining accuracy of the components to be connected and to simplify the assembly considerably, one of the supports in a preferred embodiment according to the invention is provided in a V-shaped groove of a cylindrical additional member, said additional member being secured in one of the V-shaped grooves of the coupling member. The cylindrical additional member which in turn is slidable and rotatable in the V-shaped groove, provides the possibility of adjusting the light source and the optical fiber in any mutually desired position, it being not necessary to impose any requirements upon the accuracy of connection of the light source and the optical fiber to their supports.

A favourable embodiment of the device is characterized in that the coupling member comprises two V-shaped grooves located in one plane, the cylindrical auxiliary member comprising a V-shaped groove in one of its end faces in which the support of the light source is secured, the said support comprising a connection surface for the light source present in the longitudinal direction of the cylinder in such manner that the light source is present in the center line of the cylinder.

A further embodiment is characterized in that the V-shaped grooves of the coupling member cross each other and the auxiliary member consists of a sector of a circular cylinder, the V-shaped groove in the auxiliary member being present at right angles to the cylinder axis in a flat longitudinal plane.

The simplicity of adjustment can be increased and the machining be simplified if the cylindrical supports or the additional member do not bear in the V-shaped grooves throughout their length. This can be achieved if in a further embodiment of the invention at least one of the cylindrical supports and the additional member are surrounded near their end faces by a projecting circular adjusting ring.

Figure 2:
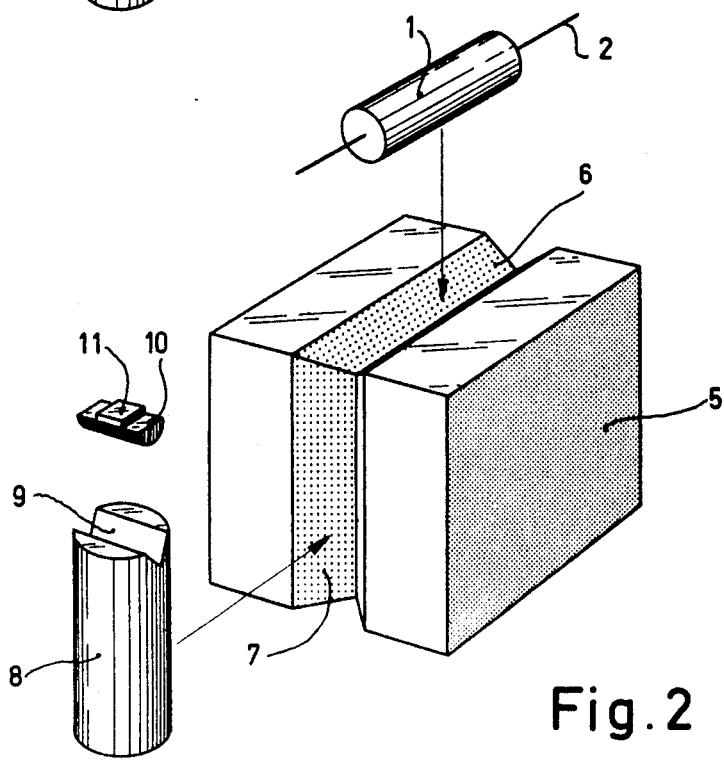
Figure 3:
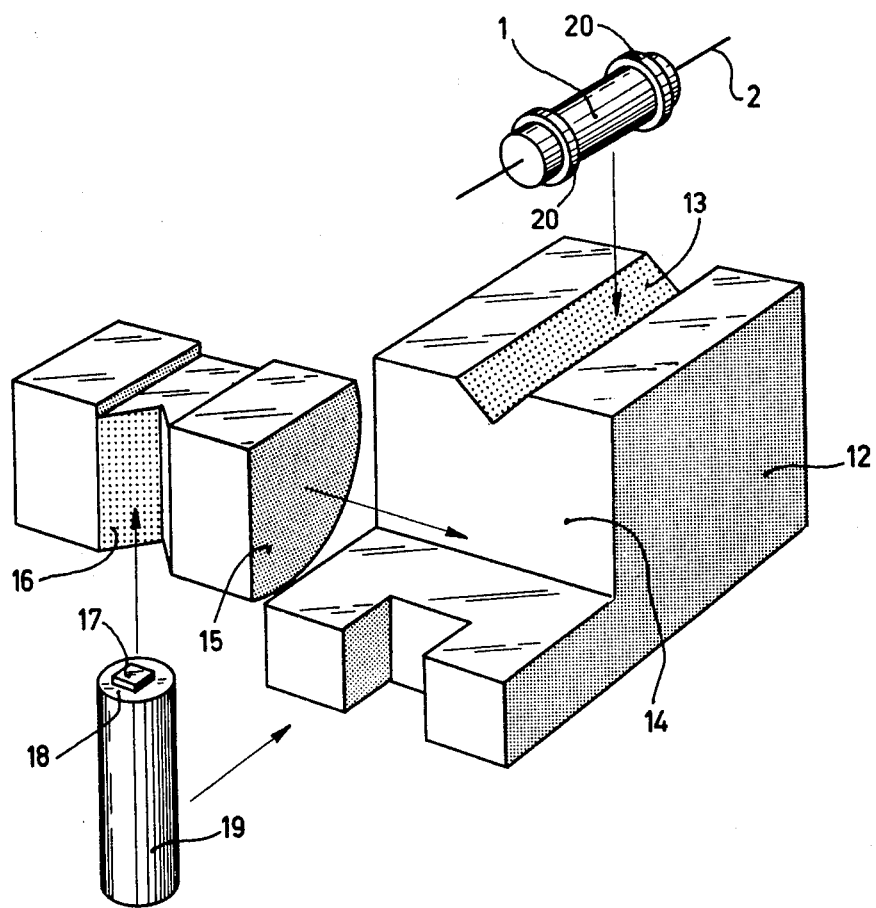

The invention will be described in greater detail with reference to embodiments shown in the drawings. In the drawings:

FIG. 1 shows a first embodiment of a coupling device which has been kept as simple as possible, FIG. 2 shows a second embodiment of the device in which an additional member permits adjustment in three directions, and FIG. 3 shows a further embodiment of a device having an additional member.

FIG. 1 is an exploded view of the first embodiment of a coupling device. An optical fiber 2 is mounted in a cylindrical support 1. A further cylindrical support 3 bears a laser 4 (for example, a semiconductor laser) on one of its end faces. V-shaped grooves 6 and 7 are provided in a coupling member 5. The support 1 is laid in groove 6 and the support 3 is laid in groove 7. The supports can be slid in the longitudinal direction but they can also perform a rotation movement in the grooves. As a result of this, the laser and one end of the optical fiber can be moved to any mutually desired position. Since the supports are in line contact with each of the sides of the grooves, a stable adjustment is possible. The supports can be fixed in the grooves in the desired position, for example by adhesion or solder, so that no mutual displacement can occur.

In the embodiment shown in FIG. 1 the optical axis of the laser should be accurately parallel to the center-line of the fiber. The exploded view of FIG. 2 shows a device in which accurate assembly, for example in the connection of the laser on the supporting surface, is not necessary because in this case further means for adjusting the laser are available. The optical fiber and its support, as well as the coupling member, correspond to those shown in FIG. 1. In this embodiment, however, an additional member 8 is present which has a cylindrical shape and comprises a V-shaped groove 9. The laser 11 is secured to a flat longitudinal surface of a semi-cylindrical support 10. since both the support 1 in groove 6, the additional member 8 in groove 7, and the support 10 in groove 9 are adjustable, any mutually desired position of the laser and the optical fiber can be achieved. Since the various parts are mutually in direct mechanical contact, accurate and stable adjustment can be ensured, while the mutual connection of the parts, for example by means of an adhesive, cannot influence their mutual position.

FIG. 3 shows a further embodiment in which a coupling member 12 is used having two grooves 13 and 14 crossing each other at an angle of 90°. The cylindrical support 1 in which the optical fiber 2 is accommodated fits in groove 13. An additional member 15 is provided in the form of a sector of a circular cylinder and comprises a V-shaped groove 16. The circular part of additional member 15 is arranged in groove 14. The laser 17 is connected to the end face 18 of a cylindrical support 19 which suppport can slide and rotate in groove 16. In this case, again, the available adjustment means are such that the laser can be moved freely in any desired position relative to the optical fiber, after which the parts can be bonded together by adhesive.

In order to avoid the necessity of having to machine the cylindrical supports and also the additional member accurately so as to engage the walls of the grooves throughout their length, one or both supports may be provided with annular parts which are arranged near their ends. FIG. 3 shows that the support 1 may be provided with rings 20. In this case, only said rings 20 which engage the V-shaped groove 13 need be machined.

As already stated, the grooves in the coupling member and in the additional member are in the form of a V. The walls may intersect each other along a line, but it is of course also possible to make a groove less deep so that its two inclined walls are connected by a flat bottom portion.

In the embodiments shown the coupling is between a semiconductor laser and one optical fiber. It will be obvious that a coupling to several fibers is possible, for example two optical fibers which are coaxial and have their ends located on opposite sides of the laser.

What is claimed is:

1. A device for coupling a light source to an optical fiber, comprising cylindrically-shaped supports for the light source and optical fiber respectively, a coupling-member having two substantially orthogonal V-shaped grooves the cylindrical supports being secured in the V-shaped grooves 2. A device as claimed in claim 1, wherein one of the supports is provided in a V-shaped groove of an auxiliary cylindrically-shaped member, said auxiliary member being secured in one of the V-shaped grooves of the coupling member.

3. A device as claimed in claim 2, wherein the coupling member comprises two V-shaped grooves located in one plane, the cylindrically-shaped auxiliary member comprising a V-shaped groove in one of its end faces in which the support of the light source is secured, the said support comprising a connection surface for the light source such that the light source lies on the center line of the cylindrical surface of the support.

4. A device as claimed in claim 2, wherein the V-shaped grooves of the coupling member cross each other and the auxiliary member is a sector of a circular cylinder, the V-shaped groove in the auxiliary member being at right angles to the axis of said cylinder.

5. A device as claimed in claim 2 wherein at least one of the cylindrical supports and the auxiliary member are surrounded adjacent their end faces by a projecting circular adjustment ring.

6. A device as claimed in claim 2 wherein the supports are secured in the grooves with an adhesive.

* * * * *